S. S. MORTON.
PROPELLING MECHANISM FOR MOTOR VEHICLES.
APPLICATION FILED JAN. 21, 1908.

914,968.

Patented Mar. 9, 1909.
3 SHEETS—SHEET 1.

WITNESSES:
R. Rogers
N. Henderson

Samuel S. Morton, INVENTOR

BY
Geo. W. Rightmire
ATTORNEY

S. S. MORTON.
PROPELLING MECHANISM FOR MOTOR VEHICLES.
APPLICATION FILED JAN. 21, 1908.

914,968.

Patented Mar. 9, 1909.
3 SHEETS—SHEET 2.

WITNESSES:
R. Rogers
H. Anderson

Samuel S. Morton INVENTOR

BY
Geo. W. Rightman
ATTORNEY

S. S. MORTON.
PROPELLING MECHANISM FOR MOTOR VEHICLES.
APPLICATION FILED JAN. 21, 1908.

914,968.

Patented Mar. 9, 1909.
3 SHEETS—SHEET 3.

WITNESSES:
R. Rogers
A. Anderson

Samuel S. Morton, INVENTOR

BY
Geo. W. Rightmire
ATTORNEY

UNITED STATES PATENT OFFICE.

SAMUEL S. MORTON, OF UPPER SANDUSKY, OHIO, ASSIGNOR TO THE OHIO MANUFACTURING COMPANY, OF UPPER SANDUSKY, OHIO, A CORPORATION OF OHIO.

PROPELLING MECHANISM FOR MOTOR-VEHICLES.

No. 914,968.  Specification of Letters Patent.  Patented March 9, 1909.

Application filed January 21, 1908. Serial No. 412,023.

*To all whom it may concern:*

Be it known that I, SAMUEL S. MORTON, a citizen of the United States, residing at Upper Sandusky, in the county of Wyandot, Ohio, have invented certain new and useful Improvements in Propelling Mechanism for Motor-Vehicles, of which the following is a specification.

My invention relates to improvements in propelling mechanism for motor vehicles and the like, and consists especially in the use of friction transmission from the driving shaft to the actuating gearing, in which preferably a friction wheel having an internal annular friction face is adapted to be thrown into and out of engagement with the friction pulley, the latter preferably being mounted upon the driving shaft.

It further consists in improved means for bringing said friction wheel into engagement with the friction pulley; it further consists in the provision of speed changing gearing which is readily and quickly manipulated.

It further consists in the provision of reverse mechanism which is simple in its construction and quickly manipulated.

It further consists in the arrangement of gearing and transmission mechanism in such manner that the power from one engine or from a plurality of engines may be transmitted to a single driven shaft, whereby any force required may be concentrated at a particular point.

It further consists in the foregoing features and others and their combinations which will be hereinafter particularly described.

Figure 1:
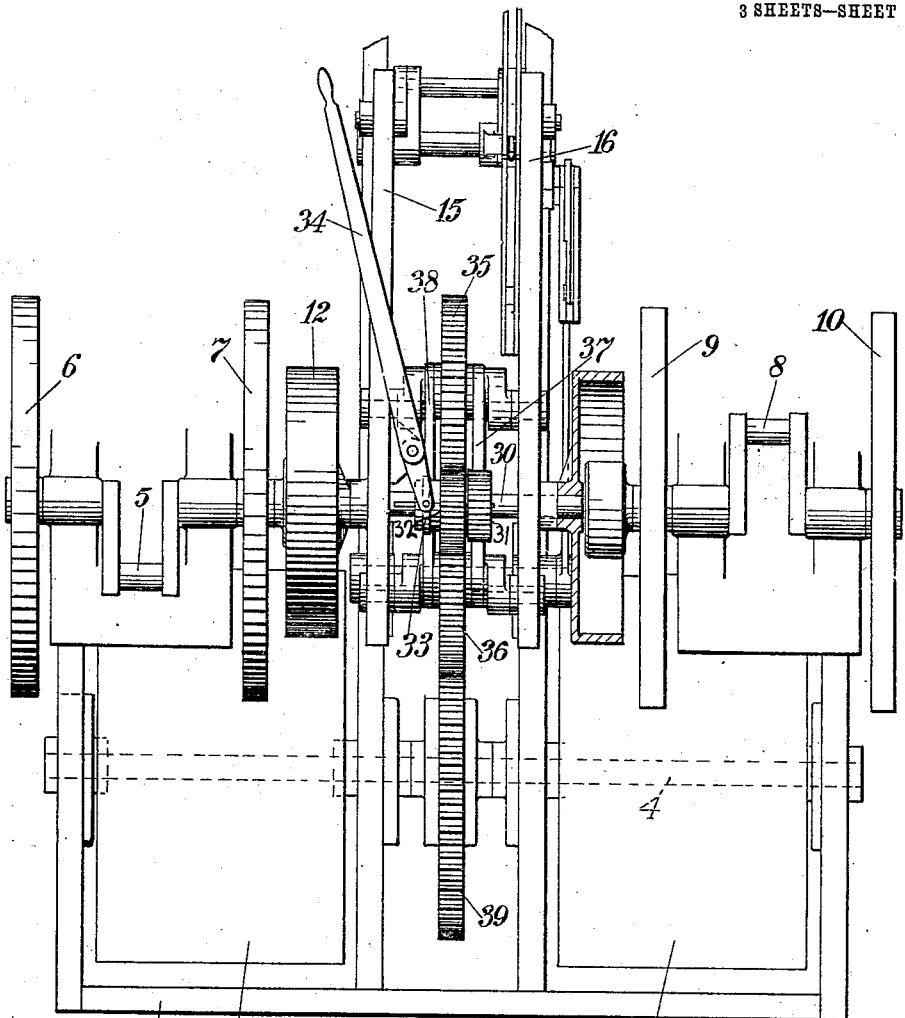
Figure 2:
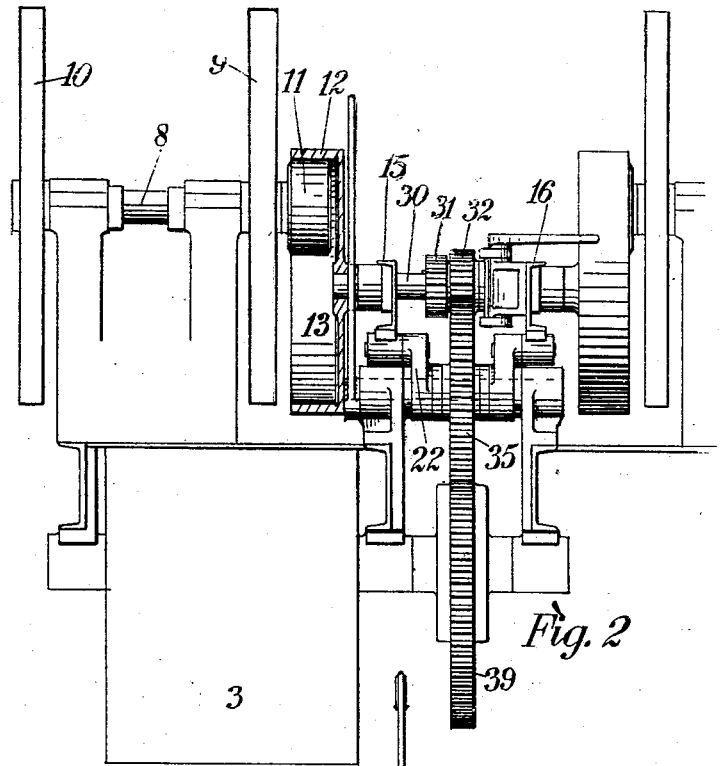
Figure 5:
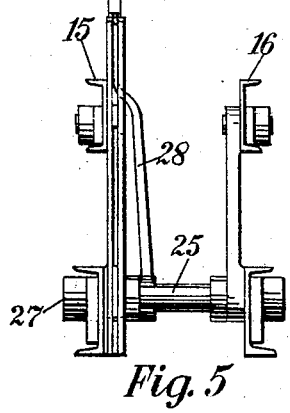
Figure 4:
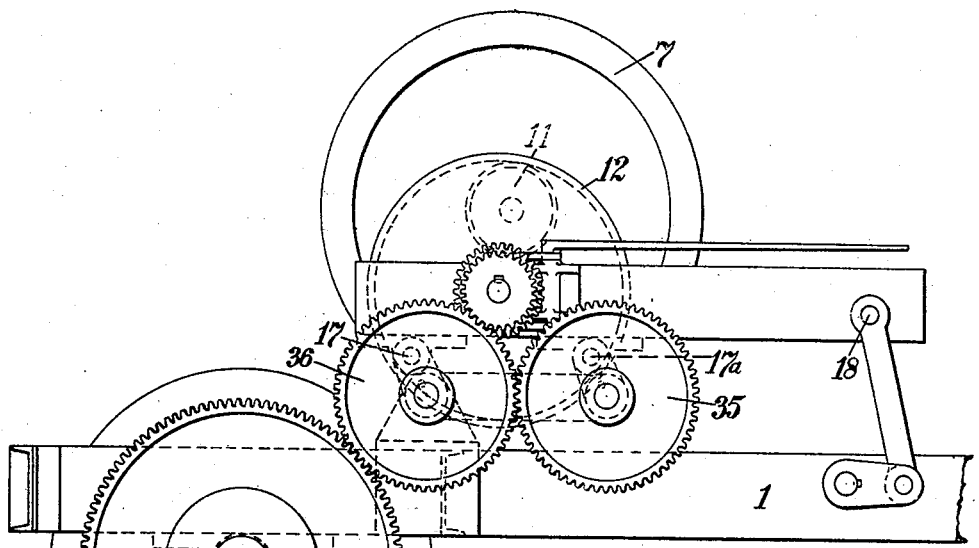
Figure 3:
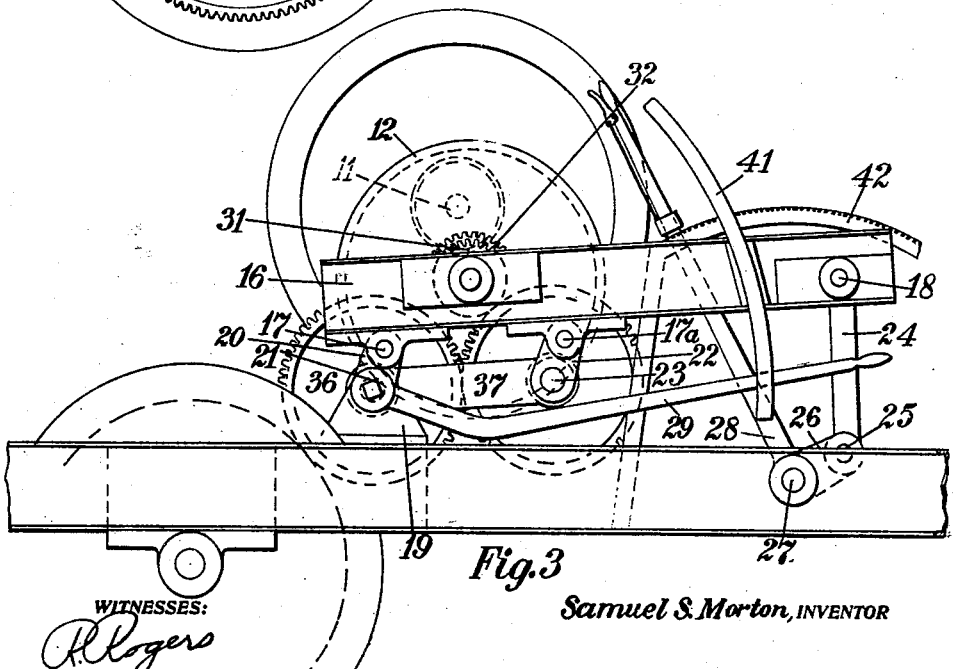

In the drawings which are hereto attached and hereby made a part of this specification, Figure 1 is a plan view of my improved propelling mechanism; Fig. 2 is an end view of the same; Fig. 3 is a side view; Fig. 4 is a side view in which the pinion engages a different gearing than that shown in Fig. 3; Fig. 5 is an elevation of the lever adapted to oscillate the frame bearing the friction wheel and pinions, showing the manner in which the same is mounted upon the framework.

Referring to the drawings in which the same numeral indicates the same part throughout, 1 is a frame mounted upon the wheels 2 and 3, the construction here shown being that of a traction engine, the wheels being traction wheels, mounted upon the shaft or axle 4; appropriately mounted upon the frame 1 is the crank shaft 5 having thereon the fly wheels 6 and 7, the engine not being shown; it is contemplated to employ a gas engine and the positioning of the same and its connection with the crank shaft 5 will be readily understood. I also show in the drawings a second crank shaft 8 and the fly wheels 9 and 10, mounted opposite to the crank shaft and fly wheel just described. The crank shaft carries at its inner end a friction pulley 11 formed preferably of fiber or similar material, for the purpose of developing a high degree of friction; the pulley 11 is mounted rigidly upon the crank shaft to rotate therewith, and so long as the engine is operating said pulley is rotated.

At 12 is shown a friction wheel having an angular internal friction face 13, with which said pulley 11 is adapted to engage, whereby the power is transmitted to said friction wheel 12; by causing the pulley to engage the wheel upon its inner face a greater contact surface is had, and consequently the wheel 12 more quickly and completely responds to the action of the friction pulley. Friction wheel 12 is mounted in such manner as to be brought into engagement with friction pulley 11 or to be moved out of engagement at the will of the operator by a construction now to be described.

A frame is provided formed of the side channels 15 and 16, said channels being mounted upon short shafts or pins 17 and 18, a rock arm 20 is mounted on the shaft 21 journaled in the bracket member 19 on the frame 1; said rock arm at its other end is connected with the shaft 17 on the channel 16, and acts as a support for the channel 16 at one end, said channel 15 being similarly supported at the same end. A link member 22 connects shaft or pin 17ª with shaft 23, whereby shaft 23 is suspended from the channel 16 at one of its ends and is similarly suspended from channel 15 at its other end; shaft 18 is supported by link 24, which at its lower end is loosely mounted upon shaft 25, which in turn is carried by lever 26 mounted rigidly upon shaft 27; lever 28 is rigidly mounted upon said shaft 27 to rotate the same; in a similar manner lever 29 is mounted rigidly upon shaft 21 to cause the same to rotate at will. The frame composed of the side channels 15 and 16 is seen to be positioned for oscillation as follows: If the lever 29 (see Fig. 3) be lifted from the position it occupies, shaft 21 will be rotated and through rock arm 20 will exert a forward movement upon the shaft 17, which, being journaled in the channels 15 and 16, will tend to move said frame forward; shaft 18 will thereby be drawn forwardly on link 24 on shaft 25, and thereby the frame made up of the side channels 15 and 16 will be given a forward movement the degree of which is determined by the movement of lever 29. A reverse movement of the lever 29 will return the parts toward the position occupied in Fig. 3.

The frame just described is also susceptible of a second oscillatory movement through lever 28, shaft 27, lever 26, shaft or pin 25, link 24 and shaft or pin 18; in this constuction the actuation of the lever 28 toward the left as shown in Fig. 3 will lift the frame on the shaft 27, and a reverse movement of said lever 28 will lower the frame. Thus an oscillatory movement vertically and a second oscillatory movement longitudinally are provided for the frame as described, the purpose of which movement will now be set forth.

Journaled in the side channels 15 and 16 is the shaft 30 having mounted thereon the pinions 31 and 32, said pinions being slidable and adapted to be positioned as desired by means of the clutch 33 controlled by the lever 34. Mounted on shaft 23 is gear wheel 35 which is therefore hung from the frame above described, and on shaft 21 is loosely mounted gear wheel 36, said shafts 23 and 21 being connected by the rigid link members 37 and 38, to maintain said gear wheels 35 and 36 constantly in mesh. By means of the lever 34, either of the pinions 31 and 32 may be brought in proper position for meshing with either of the gear wheels 35 and 36. When the frame is positioned as shown in Fig. 3, pinion 31 is adapted to mesh with gear 35, and in the position of the parts shown in Fig. 4 pinion 31 is adapted to mesh with gear 36, the latter being in mesh with the gear 39 mounted on shaft 4, whereby the power transmitted is applied as desired. The movement of the frame by means of the lever 29 and its connections serves to mesh the pinions 31 and 32 with the desired gear wheel 35 or 36, and also serves to position the parts neutrally, so that pinions 31 and 32 do not mesh with either of the gears 35 and 36. It is apparent that the meshing of either of the pinions 31 and 32, with gear 35 will drive in one direction and with gear 36 in the opposite direction; it is further apparent that if pinion 31 is brought into mesh with either of the gears, the speed will be less than that attained when pinion 32 is used; it is therefore seen that by this arrangement of pinions and gears I attain varying speeds and also direct and reverse transmissions, at will. Also mounted upon shaft 30 is the friction wheel 12 above described, and as the frame is moved downwardly or upwardly by means of the lever 28 and its connections, said friction wheel 12 is brought into engagement with friction pulley 11, or lifted out of engagement therewith; therefore when it is desired to utilize the power from the engine, the lever 28 is actuated to oscillate the frame supporting shaft 30 to bring the internal friction face of friction wheel 12 into contact with the friction pulley 11, and the said friction wheel is therefore made to answer the double purpose of a gear wheel and a clutch and through shaft 30 and a selected pinion thereon the power is transmitted to the shaft or axle 4.

The operation of the parts may be summarily stated as follows: Assuming the pinions 31 and 32 to be in neutral position, and that it is desired to drive through pinion 32, lever 34 is actuated to slide pinion 32 into proper position to mesh with either of the gears 35 or 36. Lever 29 is then moved out of its neutral position upwardly to move the frame upon which shaft 30 is journaled until pinion 32 meshes with gear 36, and lever 29 is thereupon locked in the segment rack 41. Lever 28 is now moved forwardly along the segment rack 42 until friction wheel 12 is brought into contact with the friction pulley 11 driven by the engine through crank shaft 5, and power is at once transmitted through the arrangement of pinions and gears described to the shaft or axle 4, and it is apparent that shaft or axle 4 will be driven in the same direction as the engine shaft is rotating. To reverse the direction of rotation of shaft or axle 4, pinion 32 is brought into engagement with gear 35 by depressing the lever 29, and on account of the equality of gears 35 and 36, the reverse movement will be executed at the same rate as the forward movement. As stated, to obtain higher speed, pinion 32 should be brought into mesh with the desired gear wheel. A larger number of pinions may be provided on shaft 30 if desired, thereby increasing the number of speeds. In this manner I am enabled to operate the crank shaft constantly in the same direction, and at will, through the friction devices transmit the power to the gearing, and the travel is at the same speed either through the direct or reverse drive, and the proper positioning of the parts to accomplish my purposes is quickly and easily done; there are few parts to get out of order in use, and the whole construction is one that can be successfully manipulated and operated by one who has very slight mechanical knowledge or experience.

I may use a single engine if desired, or a plurality arranged preferably side by side as illustrated in Fig. 1, and the power of all the engines is thereby concentrated; this is accomplished by manipulating the lever 29 so as to bring the pinions mounted on shaft 30 into a neutral position, in which it will not engage with either of the gear wheels 35, 36. In this position of the shaft 30, the power is transmitted thereby without imparting any movement to the gear wheels and a number of engines may in this manner be set up in series and the power transmitted through the construction described to any set of gear wheels desired, the friction wheel combining the qualities of a clutch in this instance with the capacity of a friction drive.

It will be noted that the rack 41 provided with appropriate stops for the lever 29 is carried on the second frame 16, and if the lever 29 be positioned along said rack as desired and lever 28 be then manipulated to raise or lower the frame 16, the lever 29 will be raised or lowered therewith; the effect is to move the frame 16 forwardly or rearwardly at the same time that it is moved upwardly or downwardly, and thereby the relative position of the pinions and gear wheels is maintained as desired, the pinions being moved through a short arc, gear wheel 35 also traversing a short arc. In this manner the manipulation of the lever 28 to bring the friction wheel 12 into engagement with the friction pulley 11 is accomplished without any relative change of position of pinions and gear wheels.

The propelling mechanism herein described is adapted for use in a traction engine, which use is herein illustrated; it is also adapted for use with a railroad car, and it may readily be positioned therein to transmit power to one of the axles, and said car may then be used for a switching car after the fashion of a switching engine; and with the provision of a plurality of gas engines therein, all of the power generated thereby may be brought to bear, or any number of engines desired may be used at the same time, and with the construction here shown the forward movement and the rearward movement of said car and its load will take place at the same rate of speed. It may further be used in boats, especially in ferry boats, and in this construction the power may be applied to both side wheels when movement in a straight line is desired and to a single wheel when it is desired to turn or steer the boat. It may be adapted to other uses also which need not be herein enumerated, inasmuch as its utility and efficiency have been clearly demonstrated, and other applications of the construction would fall within the scope of my idea.

I claim—

1. In propelling mechanism for a motor vehicle and the like, a frame having an engine mounted thereon, an engine shaft driven thereby having a friction pulley thereon, a second frame mounted upon said first frame, a shaft journaled in said second frame, a friction wheel on said shaft having an internal annular friction face formed thereon, a pinion on said shaft, gearing for direct and reverse transmission adapted to mesh with said pinion, means for actuating said second frame to bring said friction wheel into engagement with said friction pulley and additional means for actuating said second frame to bring said pinion into engagement with the direct or reverse transmission gearing at will.

2. Propelling mechanism for a motor vehicle and the like, comprising a frame having an engine mounted thereon, an engine shaft driven thereby having a friction pulley thereon, a second frame mounted upon said first frame, a shaft journaled in said second frame, a friction wheel on said last mentioned shaft having an internal annular friction face, means for oscillating said second frame to bring said friction wheel into engagement with said friction pulley and to break the engagement therewith, a plurality of pinions of various speeds mounted on said shaft on said second frame, direct and reverse transmission gearing, and means for actuating said second frame to bring a selected pinion on said shaft on the said second frame into mesh with either the direct or reverse transmission gearing at will.

3. In propelling mechanism for a motor vehicle and the like, a frame, a shaft journaled thereon, a pinion on said shaft, a friction wheel on said shaft, direct and reverse gearing, means for oscillating said frame longitudinally to mesh said pinion with the direct or reverse gear at will, an engine shaft bearing a friction pulley, and means for bringing said friction wheel into internal engagement with said friction pulley.

4. In propelling mechanism for a motor vehicle and the like, a frame, a shaft journaled thereon carrying a pinion, a friction wheel having an internal frictional face on said shaft, direct and reverse gearing appropriately mounted, means for oscillating said frame to bring said pinion into mesh with said direct and reverse gearing at will, an engine shaft having a friction pulley thereon, and means for oscillating said frame arcwise to engage said internal friction face on said friction wheel with said pulley, and to disengage the same therefrom.

5. In propelling mechanism for a motor vehicle and the like, a main frame, a second frame mounted thereon, a shaft carried by said second frame, a pinion thereon, a friction wheel having an internal annular friction face on said shaft, an engine shaft having a friction pulley thereon, a shaft journaled in said main frame, a gear wheel mounted loosely on said shaft, a shaft suspended from said second frame, a gear wheel carried thereon, means for oscillating said second frame to bring said pinion into mesh with either of said gear wheels at will, and means for oscillating said frame to bring said internal friction face of said friction wheel into engagement with said friction pulley.

6. In propelling mechanism for a motor vehicle and the like, a frame, a shaft journaled thereon carrying a pinion, a friction wheel on said shaft having an internal annular friction face, direct and reverse gear wheels appropriately mounted, means for oscillating said frame longitudinally to engage said pinion with said direct and reverse transmission gear wheels at will, an engine shaft having a friction pulley thereon, and means for oscillating said frame vertically to bring said internal friction face of said friction wheel into and out of engagement with said friction pulley.

7. In propelling mechanism for a motor vehicle and the like, a main frame, a second frame mounted thereon, a shaft journaled in said second frame having a pinion thereon, a wheel carried by said shaft having an internal annular friction face, a shaft mounted on said main frame, a gear wheel carried loosely thereon, a shaft supported on said second frame, a gear wheel thereon adapted to enmesh with said first mentioned gear wheel, means for maintaining said gear wheels in mesh, means for oscillating said second frame to bring said pinion into mesh with either of said gear wheels at will, an engine shaft having a friction pulley thereon, and additional means for oscillating said second frame to bring the internal friction face of said friction wheel into engagement with said friction pulley whereby power from said engine is transmitted to said gear wheels.

8. Propelling mechanism for a motor vehicle or the like comprising a plurality of engine driven shafts, a friction pulley carried on each of said shafts, a frame arranged intermediate said engines, a shaft journaled in said frame having a pinion thereon, a friction wheel having an internal annular friction face carried at each end of said shaft, direct and reverse gear wheels appropriately mounted, means for oscillating said frame to enmesh said pinion with either of said gear wheels at will, and means for oscillating said frame to bring said internal friction face of each of said friction wheels into engagement with said friction pulleys, whereby the combined power from the engines is transmitted to the said gear wheels.

9. In propelling mechanism for a motor vehicle and the like, a main frame, a second frame mounted thereon, a shaft journaled in said second frame carrying a pinion, a friction wheel having an internal friction face mounted on said shaft, an engine driven shaft having a friction pulley thereon, a shaft mounted on said main frame, a gear wheel mounted thereon, a shaft supported on said second frame having a gear wheel thereon of the same diameter as said first mentioned gear wheel and adapted to mesh therewith, means for maintaining said gear wheels constantly in mesh, means for oscillating said second frame to engage said friction wheel with said friction pulley to transmit the power from said engine shaft, and means for oscillating said second frame to bring said pinion into mesh with one of said gear wheels to drive directly, and with the other of said gear wheels to drive reversely, whereby the reverse movement of the vehicle is at the same speed as its direct or forward movement.

10. In propelling mechanism for a motor vehicle and the like, a frame mounted for oscillation, a shaft journaled thereon, a pinion on said shaft, gearing mounted in said frame and adapted to mesh with said pinion, means for positioning said pinion with respect to said gearing as desired and means for oscillating said frame arcwise in a vertical manner whereby said frame is also caused to move arcwise in a horizontal manner, thereby maintaining the relative positions of said pinion and said gearing.

11. In propelling mechanism for motor vehicles and the like, a subframe, a second frame mounted thereon for oscillation, a lever for oscillating said second frame arcwise in substantially a horizontal direction adapted to position said second frame and to be locked thereto, a second lever adapted to oscillate said second frame arcwise in substantially a vertical direction, whereby said second frame through the locking of said first lever thereto is also oscillated in a substantially horizontal direction, and power transmitting devices appropriately mounted on said frames.

12. In propelling mechanism for motor vehicles and the like, a subframe, a shaft mounted thereon, a rock arm on said shaft, a second shaft on said subframe, a rock arm thereon, a second frame supported at one end on the arm on said first mentioned shaft, a link mounted on the arm on said second shaft adapted to support said second frame at its other end, a lever mounted on said first mentioned shaft adapted to rotate the same whereby said second frame is moved in substantially a horizontal direction, means on said second frame for locking said lever thereto in any desired position, a second lever mounted on said second shaft adapted to oscillate said second frame in substantially a vertical direction whereby said second frame is also caused to move in substantially a horizontal direction, a gear wheel mounted loosely on said first shaft, a second gear wheel suspended from said second frame and adapted to mesh therewith, a pinion carried on said second frame and adapted by manipulating said first lever to be drawn into mesh with either of said gear wheels or to be left in neutral position as desired, and means for transmitting power to said pinion.

In testimony whereof I affix my signature in the presence of two witnesses.

SAMUEL S. MORTON.

Witnesses:
JOHN T. CAREY,
H. H. NEWELL.